Dec. 7, 1926.                                              1,609,469
K. W. HALLDEN
AIR SPRING
Original Filed August 30, 1919    2 Sheets-Sheet 2
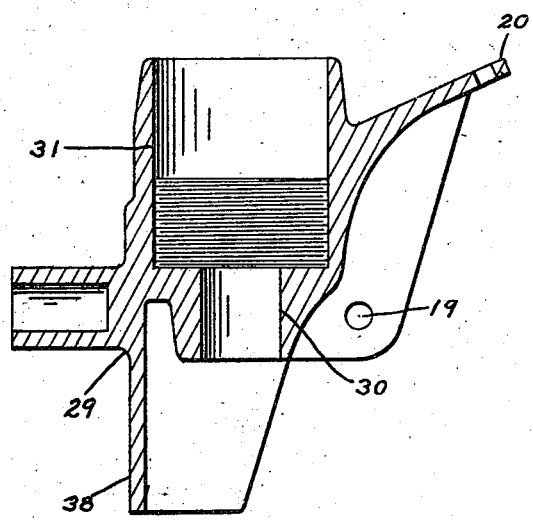
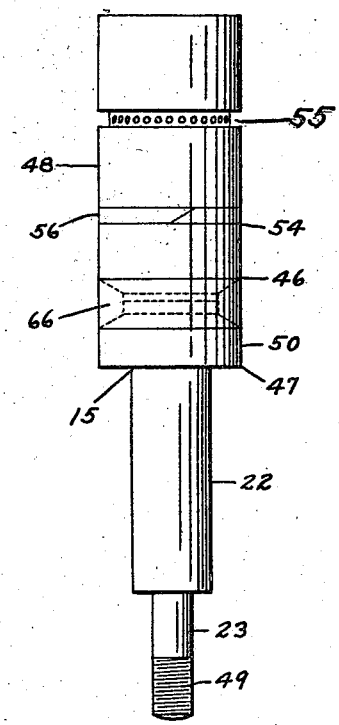
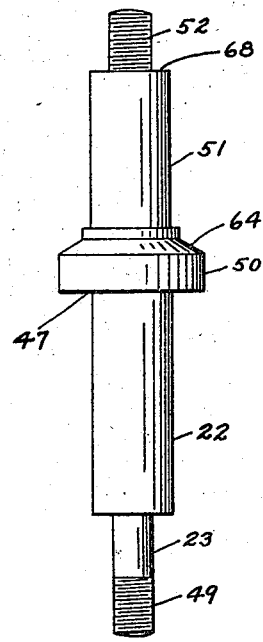
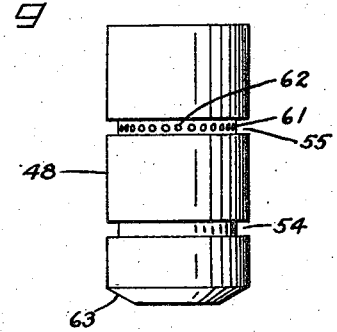
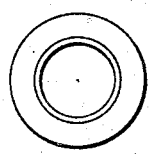
Inventor
Karl William Hallden,
By Louis M. Schmidt
Atty.

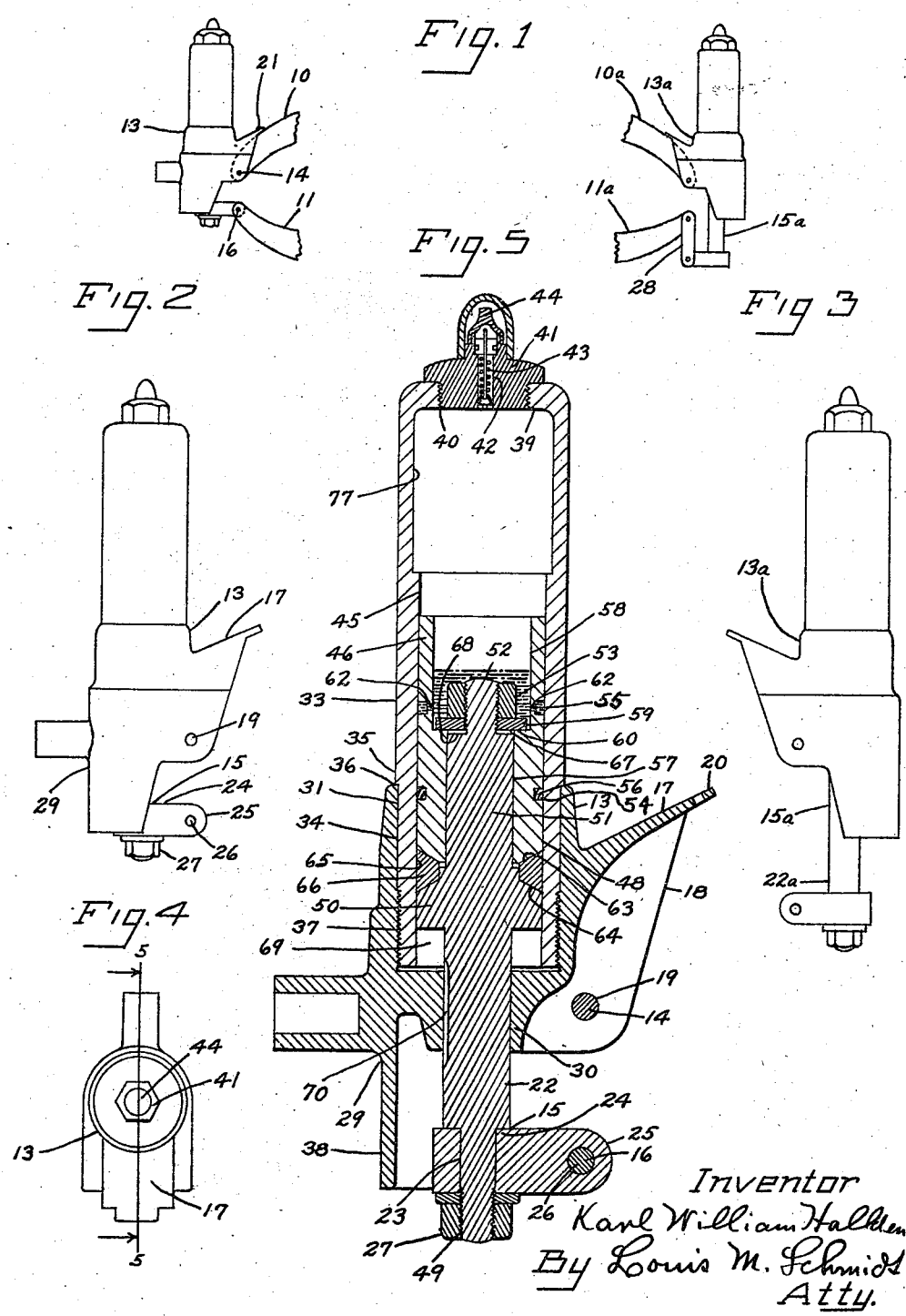

Patented Dec. 7, 1926.

1,609,469

UNITED STATES PATENT OFFICE.

KARL WILLIAM HALLDEN, OF WATERBURY, CONNECTICUT.

AIR SPRING.

Continuation of applications Serial No. 320,876, filed August 30, 1919, abandoned May 4, 1922, and Serial No. 515,728, filed November 16, 1921, abandoned October 17, 1925. This application filed January 9, 1925. Serial No. 1,468.

My invention relates to improvements in air springs, particularly in the form used as shock absorbers for automobiles, the present application being in continuation of my applications filed August 30, 1919, Serial No. 320,876, and November 16, 1921, Serial No. 515,728, and the object of my improvement is simplicity and economy in construction and convenience and efficiency in use.
In the accompanying drawing:—

Figure 1 is a side elevation of part of an automobile that is equipped with a set of my improved air springs, the view showing one form of the device at the front end and a form slightly modified as to details at the rear end.

Figure 2 is a side elevation on an enlarged scale of the front air springs shown in Fig. 1.
Figure 3 is a side elevation of the rear air spring shown in the said Fig. 1.

Figure 4 is a plan view of the front air spring.

Figure 5 is a sectional view on the line 5—5 of Fig. 4.

Figure 6 is a similar view of the main frame member.

Figure 7 is a side elevation of the piston structure for the front air spring.
Figure 8 is a side elevation of the stem or piston rod.

Figure 9 is a side elevation of the upper piston or plunger body.

Figure 10 is a plan view of the same.
My improved air spring as applied to automobiles is used in sets that are composed of four springs that are arranged in pairs, one pair of similar springs being used at the front end and another pair of springs that are similar and differing in certain structural details from the springs that are used at the front end being used at the rear end.

In the case of the front springs, the front supporting arm 10 of the chassis and the cooperating arm 11 of the front spring are separated by the air spring structure instead of being connected directly together, as usual, by the shackle bolt. Thus the main frame member 13 is connected to the chassis arm 10 by means of a bolt 14 and the piston structure 15 is connected to the automobile spring arm 11 by means of a bolt 16 that is appreciably below the bolt 14, the bolts 14 and 15 being housed in the openings in the chassis arm 10 and the automobile spring arm 11, respectively, that are usually used for the shackle bolt.

The main frame member 13 has at the rear a supporting structure in the form of a plate-like arm 17 for lying along the upper face of the chassis arm 10 and a pair of side plates 18 extending downwardly therefrom for engaging with the side faces of the chassis arm 10. The side plates 18 have holes 19 for the bolt 14 and the upper plate-like arm 17 has adjacent the end 20 a hole for a bolt 21 for effecting a positive connection with the chassis arm 10.

The piston structure 15 comprises a rod or stem 22 that has a reduced portion 23 at the lower end on which is mounted a bracket 24 that has a rearwardly extending lug 25 that serves as the connecting means with the automobile spring arm 11, having a hole 26 for the bolt 16. A nut 27 holds the bracket 24 in place.

The main frame member 13 and the piston structure 15 are operatively connected together in a manner to be described by an air spring structure that permits of relative movement of the parts and that serves as a cushioning or shock absorbing device.

In the case of the rear air spring the main frame member $13^a$ is connected to the rear end of the chassis arm $10^a$ in substantially the same manner as the front main frame member 13 is connected to the chassis arm 10, as described. The piston structure $15^a$, however, is connected to the automobile spring arm $11^a$ indirectly through the medium of a link 28 instead of being directly connected thereto as in the case of the front air spring. Also, the piston stem or rod $22^a$ is longer than the rod 22 to compensate for the extra length of the structure due to the use of the link 28.

The internal structures of the front and rear air springs are substantially similar, so that a description of either one will suffice.

Considering the front air spring, the main frame member 13 thereof comprises in front of the supporting portion and the connecting bolt 14 the body portion 29 of generally cylindrical form and upwardly directed, and having a bore of two dimensions for the lower and upper portions respectively. The lower portion 30 of the said bore is a fit for the stem or rod 22 and the upper portion 31 of the said bore is relatively enlarged, suitably to receive the lower end 34 of the cylinder structure 33. The said lower end 34 of the cylinder structure 33 which is reduced slightly relatively to the adjacent body portion 35 to provide a shoulder 36 for resting on the upper end of the body portion 29, fits within the upper portion 31 of the bore, and is held in place by means of a screw thread connection 37 that is provided between the extreme lower end and the opposed portion of the wall of the bore.

The front part of the arm 13 is provided with an apron 38 that extends downwardly from the body portion 29 that is of suitable length and form to protect that adjacent part of the piston structure 15.

The cylinder structure 33 is of appreciable length, extending upwardly from the frame 13, has an open interior, and has an end wall 39 that is provided with a screw threaded opening 40 for receiving the screw plug 41.

The screw plug 41 is provided with an axial bore 42 in which is housed a check valve structure 43 such as is used with pneumatic tires, the outer end of which is closed by a removable cap 44 of ordinary form.

The side walls of the interior of the cylinder structure 33 have a diameter for the major and lower portion 45 that is a fit for the exterior of the piston structure 46 and a slightly larger diameter for the upper portion 77. The said lower portion 45 serves as the cylinder proper, being of suitable length to permit of proper operation of the piston body 46 therein, and the said upper portion 77, which is beyond the range of movement of the said piston body 46, serves as an air space for containing air under pressure that is admitted through the check valve structure 43.

The piston structure 15 comprises operatively as one part the stem or rod 22 that fits the opening 30 in the frame 13 and as a second part the piston body 46 that fits the cylinder proper 45. These parts are constructed in a special manner so as to effect certain special functions and features of utility, as will be described.

The said piston structure 15, as to details of its structure, comprises in part two main parts or members, respectively the axial or stem part 47 and the shell or sleeve part 48, and an intermediate part 66 in the form of a filling of annular form and of appreciable depth or thickness that is interposed between said main parts and is made of metal that is adapted to yield under pressure so as to change its form.

The axial member 47 comprises as a unitary structure the stem 22, the reduced portion 23 for the bracket 24 below the said stem 22, and the still further reduced and threaded portion 49 for the nut 27 next below the reduced portion 23, and an annular collar 50 at the upper end of the stem 22, extending upwardly from the said collar 50 is a stem extension 51 that terminates at the upper end in the form of a still further reduced and threaded neck 52 for the clamping nut 53.

The annular collar 50 constitutes the lower end of the piston body 46 and has a peripheral diameter such as to provide a good fit for the cylinder 45.

The shell or sleeve member 48 is of generally cylindrical form and of appreciable length, and constitutes the upper and major portion of the piston body 46, the peripheral wall being an operative fit for the cylinder 45 generally and having, as shown, a pair of grooves comprising a lower groove 54 and an upper groove 55. A piston ring 56 is housed in the lower groove 54. The said sleeve member 48 has a bore 57 for the lower portion that is a fit for the stem extension 51 and a bore 58 for the upper portion that is enlarged relatively to the bore 57 suitably to provide a chamber for housing the clamping nut 53 and the clamping washer 59, and to provide an annular seat 60 opposed to the said washer 59 at the junction of the said bores 57 and 58.

The shell wall 61 at the back or bottom of the upper groove 55 is provided with a plurality of radial perforations 62 that provide communication between the inner chamber 58 and the groove space and thence to the peripheral wall of the sleeve member 48 and the opposed enclosing wall of the cylinder 45.

The chamber 58 besides serving as the housing for the clamping nut 53 and the washer 59 serves as a cup or retainer under conditions of use for an appreciable quantity of grease.

The shell member 48 is assembled on the stem extension 51 so that the lower end face 63 of the shell member is separated from the upper end face 64 of the collar 50 by a generally annular space 65 and which space 65 is filled by the filling 66 and designated as the intermediate part of the piston structure. Said intermediate part 66 may be made of Babbitt metal or may be in the form of a ring or collar of some other metal that is suitable to operate to effect the result desired, which result may be designated briefly as providing a fit for the piston and cylinder. In use, the ring 66 is compressed longitudinally by end pressure so that the structure is deformed, the metal yielding, and the peripheral wall is squeezed outwardly, laterally so as to provide a tight operative fit with the opposed portion of the wall of the cylinder. Thus said peripheral wall operates as a bearing for the piston structure. The ring 66 is adapted to sustain ordinary or normal compression strains but is adapted to yield under abnormal pressure, and such abnormal pressure is applied only as occasion may require for the purpose of improving the fit and taking up wear.

In a way the ring 66 operates like a packing but differs from a packing as usually applied in that in use it serves as a part of an all metal piston structure. Also, it extends over a greater length of the piston structure or a greater part of such length than would be practically possible in the case of a packing that is made of fibrous material and of the character of packings in common use.

The parts are constructed and arranged so that there is a slight clearance space 67 between the upper end face 68 of the stem extension 51 and the shoulder 60 on which is seated the clamping washer 59 so that the clamping nut 53 in effecting a clamping pressure for holding the shell member 48 in place effects through the medium of the said shell member 48 a direct pressure on the metal ring structure 66. Also, in use, whether being moved upwardly or downwardly, there is in either case a pressure from one end or the other on the said ring structure 66. As a detail, the opposed faces 63 and 64 that form the upper and lower walls or boundaries for the metal ring structure 66 are each conical and tend to produce under pressure an expanding effect on the ring structure 66 and thereby to ensure an efficient engagement of the piston body 46 in the cylinder 45.

The upper groove 55 is positioned above the shoulder 60, so as to communicate by means of the perforations 62 with the chamber 58, as described, and the lower piston ring groove 54 is appreciably below the said shoulder 60.

The parts are, furthermore, constructed and arranged so that an air cushioning space is provided between the lower end of the piston body 46 and the opposed bottom wall of the cylinder 45, as indicated at 69. The piston stem 22 is provided with a longitudinal groove 70 that is so positioned as to permit of the escape of air from below the piston body 46 for the greater part of the range of movement of the piston structure, the portion of the stem 22 adjacent the collar 50 being without such groove, so that an appreciable quantity of air will be confined within the space 69 for effecting the cushioning mentioned.

In use, oil or grease is supplied to the cup 58 and air under pressure is pumped into the air space 77, and through these mediums the cylinder structure is supported from the piston structure, and through these structures the chassis is supported from the automobile spring, the air spring or shock absorbing effect being obtained from the compressed air in the air space 77. The radial holes 62 through the wall of the cup 58 ensure an equalizing effect as to pressures on the oil or grease within said cup 58 and such as may leak through and creep up as a film or in any way become interposed between the opposed walls of the piston and cylinder.

The piston ring 56 serves to prevent leakage downwardly, and the metal ring 66, which is below said piston ring 56, cooperates in a positive manner to prevent downward leakage of grease.

The piston ring 56 is an expansion ring and operates to take up wear in the usual manner.

In the case of the metal ring 66 adjustment for wear is effected by tightening the clamping nut 53.

The cushioning effect of the air confined in the air space 69 operates in case of extreme relative movement of the piston and cylinder.

I claim as my invention:

1. An air spring composed of two main parts consisting of a cylinder and a piston having telescoping side walls, said parts being constructed and arranged to confine air under pressure that serves under conditions of use to determine the relative positions of said parts, one of said side walls having a circumferential groove, a reservoir, and a set of ducts connecting said groove and reservoir, and said reservoir being provided with a supply of grease, an extension from said supply filling said ducts and groove.

2. In an air spring structure, a vertically elongated cylinder structure, a piston operative therein, and sealing means for the opposed walls provided on said piston comprising in combination an expansible metallic piston ring adjacent the middle, an annular body of metal that is expansible under pressure positioned below said piston ring, and an open groove above said piston ring, a reservoir for sealing material, and ducts leading from said reservoir to said groove.

3. In an air spring as described in claim 2, sealing material supplied to said reservoir, ducts, and groove in the form of grease.

4. In an air spring, a cylinder and a piston operative therein, a stem for the said piston, and the said piston comprising at one end a collar that is integral with the said stem, at the other end a shell-like member that is removably mounted on the said stem and opposed to the said collar, and a filling of relatively yieldable metal housed between the opposed portions of the said member and collar, means for holding the parts together comprising screw-threaded engaging parts, the said member having the upper portion in the form of a cup for oil or grease, and the said screw-threaded engaging parts being housed in the said cup.

5. An air spring comprising a cylinder closed at one end and having the other end provided with an opening for the piston rod, a piston housed in the said cylinder and having the said piston rod extended from one end and passing through the said opening, the space between the said piston and the closed end of the cylinder serving as a main chamber for compressed air under normal conditions of operation and being provided with sealing means, the other end of the said cylinder serving as a cushioning air chamber in cooperation with the piston and piston rod, a part of the said piston rod adjacent said piston fitting and filling the said opening so as to confine air in the said cushioning air chamber, and the portion of the said piston rod outward from and adjacent the said part being longitudinally grooved for the passage of air so as to limit the cushioning effect of the said cushioning air chamber.

6. An air spring structure having a cylinder and a piston structure, the said piston structure being composed of two main parts comprising an axial part and a shell part, the said axial part comprising a collar, a stem below the said collar, and a stem extension above said collar, the said shell part being generally of cylindrical form, being mounted on the said extension in spaced relation to the said collar, and having the upper portion cupped so as to provide a container for oil or grease, the side wall of the said container being perforated, a metal packing ring positioned in the space between the said shell part and collar, and a clamping nut on the said stem extension for engaging with the said shell part.

7. An air spring comprising a cylinder and a piston operative therein and having means for supplying air under pressure to the space between the cylinder and the upper end of the piston, the said upper end of the piston being provided with a depression that serves as a cup, the peripheral wall of the piston having a circumferential groove, and the piston having perforations for providing communication between said cup and groove, whereby with a supply of grease in the cup when in use grease will fill the groove and serve as a dam or seal to prevent downward movement of air from said space to the lower portion of the air spring structure.

8. An air spring comprising a cylinder and a piston operating therein, said piston being composed of an upper part, an intermediate part, and a lower part that are held together by pressure, the peripheries of said parts operating as bearing surfaces in cooperation with the opposed wall of the cylinder, said intermediate part being made of metal having a character such as to yield and change shape of the cross-section under abnormal pressure, said cylinder having one end closed and cooperating with the opposed end of the piston for enclosing an air receiving space or chamber, and the portion of the periphery between said end of the piston and said intermediate part being provided with a circumferential groove for housing a sealing compound.

9. An air spring comprising a cylinder and a piston operating therein, said piston being composed of an upper part, an intermediate part, and a lower part that are held together by pressure, the peripheries of said parts operating as bearing surfaces in cooperation with the opposed wall of the cylinder, said intermediate part being made of metal having a character such as to yield and change shape of the cross-section under abnormal pressure, said upper part being cupped for housing a supply of sealing compound having a circumferential groove in the periphery for receiving such compound, and being provided with ducts connecting said groove with the supply of sealing compound.

10. An air spring comprising a cylinder and a piston operating therein, said piston being composed of an upper part, an intermediate part, and a lower part that are held together by pressure, the peripheries of said parts operating as bearing surfaces in cooperation with the opposed wall of the cylinder, said intermediate part being made of metal having a character such as to yield and change shape of the cross-section under abnormal pressure, said upper part having a circumferential groove in the periphery, said groove being supplied with a sealing compound, and said compound having the characteristics of grease.

11. An air spring comprising a vertically elongated cylinder that is closed at the upper end, a piston operative in said cylinder and having a downwardly projecting stem, said cylinder and said piston respectively having means for being connected to different parts of an automobile structure, sealing means and devices for cooperating under operating conditions for maintaining the operative relation of said cylinder and piston, said piston being operatively a solid and unbroken metal structure, and said sealing means comprising in combination, a circumferential groove for grease and spaced from said groove and constituting a part of one of said walls or faces, a zone, cylindrical in form, of metal having a closer fit for the opposed wall or face than the other adjacent parts of said one wall or face, whereby the grease will operate to prevent leakage of air and the metal of said zone will prevent the escape of grease.

12. An air spring comprising a vertically elongated cylinder that is closed at the upper end, a piston operative in said cylinder and having a downwardly projecting stem, said cylinder and said piston respectively having means for being connected to differing parts of an automobile structure, sealing means and devices for cooperating under operating conditions for maintaining the operative relation of said cylinder and piston, said piston being operatively a solid and unbroken metal structure, said stem projecting through one end of said cylinder, said one end of the cylinder having an end wall that has an opening fitting said stem, and said stem having an open groove extending along the length of part of the periphery.

KARL WILLIAM HALLDEN.